(12) United States Patent
Tsuchida et al.

(10) Patent No.: US 11,268,532 B2
(45) Date of Patent: Mar. 8, 2022

(54) ELECTRIC BLOWER, ELECTRIC VACUUM CLEANER, AND HAND DRYER

(71) Applicant: Mitsubishi Electric Corporation, Tokyo (JP)

(72) Inventors: Kazuchika Tsuchida, Tokyo (JP); Naho Adachi, Tokyo (JP); Masaya Teramoto, Saitama (JP); Mitsumasa Hamazaki, Saitama (JP); Kazunori Hatakeyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/970,120

(22) PCT Filed: Feb. 28, 2018

(86) PCT No.: PCT/JP2018/007400
§ 371 (c)(1),
(2) Date: Aug. 14, 2020

(87) PCT Pub. No.: WO2019/167153
PCT Pub. Date: Sep. 6, 2019

(65) Prior Publication Data
US 2020/0400157 A1    Dec. 24, 2020

(51) Int. Cl.
*F04D 25/06*    (2006.01)
*F04D 29/056*    (2006.01)
(Continued)

(52) U.S. Cl.
CPC ............ *F04D 29/056* (2013.01); *A47L 5/28* (2013.01); *F04D 25/0606* (2013.01);
(Continued)

(58) Field of Classification Search
CPC ............... F04D 25/0606; F04D 25/082; F04D 29/056; F04D 29/281; F04D 29/4226; F04D 29/5806; F04D 29/441; H02K 9/06
See application file for complete search history.

(56) References Cited

U.S. PATENT DOCUMENTS 2,968,249 A * 1/1961 Caine ........................ F04D 3/00
417/369
5,350,281 A * 9/1994 Hagshenas ............ F04D 25/082
415/144
(Continued)

FOREIGN PATENT DOCUMENTS

JP    S51-098807    8/1976
JP    S53-060109 U    5/1978
(Continued)

OTHER PUBLICATIONS

International Search Report of the International Searching Authority dated May 22, 2018 for the corresponding International application No. PCT/JP2018/007400 (and English translation).
(Continued)

*Primary Examiner* — Ninh H. Nguyen
(74) *Attorney, Agent, or Firm* — Posz Law Group, PLC

(57) ABSTRACT

An electric blower includes a motor including a rotor having a rotation shaft, and a stator provided to surround the rotor, a moving blade mounted at one end side of the rotation shaft in the axial direction of the rotation shaft, a bearing portion provided between the moving blade and the stator in the axial direction and rotatably supporting the rotation shaft, and a frame. The frame includes a motor housing portion housing the stator, a bearing housing portion housing the bearing portion, a wall formed between the motor housing portion and the bearing housing portion and facing the moving blade, and a hole passing through the wall. The electric blower further includes a first air path outside the
(Continued)

frame, and a second air path inside the frame. An air volume in the first air path is larger than an air volume in the second air path.

14 Claims, 14 Drawing Sheets

(51) Int. Cl.
    *A47L 5/28*     (2006.01)
    *F04D 29/28*     (2006.01)
    *F04D 29/44*     (2006.01)
    *F04D 29/58*     (2006.01)
    *H02K 9/06*     (2006.01)
    *F04D 29/42*     (2006.01)

(52) U.S. Cl.
    CPC ....... *F04D 29/281* (2013.01); *F04D 29/4226* (2013.01); *F04D 29/44* (2013.01); *F04D 29/441* (2013.01); *F04D 29/58* (2013.01); *F04D 29/5806* (2013.01); *H02K 9/06* (2013.01); *F04C 2240/50* (2013.01)

(56) References Cited

U.S. PATENT DOCUMENTS

| | | | |
|---|---|---|---|
| 7,259,486 B2* | 8/2007 | Yamamoto | F04D 25/082 310/90 |
| 2012/0139385 A1* | 6/2012 | Sawada | H02K 1/148 310/216.074 |
| 2015/0351599 A1* | 12/2015 | Park | A47L 9/22 417/423.2 |
| 2017/0194833 A1 | 7/2017 | Bang et al. | |
| 2017/0311766 A1 | 11/2017 | Hayamitsu et al. | |
| 2019/0036423 A1 | 1/2019 | Oketani et al. | |
| 2019/0101129 A1 | 4/2019 | Teramoto et al. | |
| 2019/0159640 A1* | 5/2019 | Hayamitsu | H02K 7/14 |

FOREIGN PATENT DOCUMENTS

| | | |
|---|---|---|
| JP | S56-041119 Y2 | 9/1981 |
| JP | S62-70697 A | 4/1987 |
| JP | H8-196470 A | 8/1996 |
| JP | H11-336696 A | 12/1999 |
| JP | 2001-112198 A | 4/2001 |
| JP | 2006-104976 A | 4/2006 |
| JP | 2006-144556 A | 6/2006 |
| JP | 2006-299808 A | 11/2006 |
| JP | 2013-24133 A | 2/2013 |
| JP | 2016-211533 A | 12/2016 |
| WO | 2016-189763 A1 | 1/2016 |
| WO | 2017/169033 A1 | 10/2017 |
| WO | 2017-175387 A1 | 10/2017 |

OTHER PUBLICATIONS

Chinese Office Action dated May 8, 2021, issued in corresponding Chinese Patent Application No. 201880089820.9 (and English Machine Translation).
Office Action dated Dec. 1, 2020 in connection with counterpart Japanese Patent Application No. 2020-503148 (and English machine translation).
Japanese Office Action dated Apr. 6, 2021, issued in corresponding Japanese Patent Application No. 2020-503148 (and English Machine Translation).
European Search Report dated Feb. 3, 2021, issued in corresponding EP Patent Application No. 18908189.6.
Chinese Office Action dated Nov. 2, 2021, issued in corresponding Chinese Patent Application No. 201880089820.9(and English Machine Translation).

* cited by examiner

ELECTRIC BLOWER, ELECTRIC VACUUM CLEANER, AND HAND DRYER

CROSS REFERENCE TO RELATED APPLICATION

This application is a U.S. national stage application of International Patent Application No. PCT/JP2018/007400 filed on Feb. 28, 2018, the disclosure of which is incorporated herein by reference.

TECHNICAL FIELD

The present invention relates to an electric blower, an electric vacuum cleaner, and a hand dryer.

BACKGROUND

Along with downsizing of electric blowers, it is demanded to increase a rotation speed of a motor of the electric blower. As the rotation speed of the motor increases, a centrifugal force acting on a rotating portion of the motor increases. Thus, if a center of a rotation shaft of the motor, a center of a stator, and centers of bearings supporting the rotation shaft are not accurately matched with each other, whirling may be caused by the centrifugal force.

Patent reference 1, for example, proposes a motor having one bearing mounted at one end of a motor frame in an axial direction, and another bearing mounted at the other end of the motor frame in the axial direction via a bracket.

PATENT REFERENCE

Patent Reference 1: Japanese Patent Application Publication No. 2013-24133 (see FIG. 1)

However, when two bearings are mounted on separate members as described above, it is difficult to match the centers of the bearings with each other. Thus, this structure cannot be said to be suitable for high-speed rotation.

Furthermore, the amount of heat generated by the motor increases with an increase in the rotation speed of the motor, and thus enhancement in the heat dissipation efficiency is also desired.

SUMMARY

The present invention has been made to solve the above-described problems, and an object of the present invention is to provide an electric blower that inhibits whirling of the rotating portion and exhibits high heat dissipation efficiency.

An electric blower according to the present invention includes a motor including a rotor having a rotation shaft, and a stator provided to surround the rotor, a moving blade mounted at one end side of the rotation shaft in the axial direction of the rotation shaft, a bearing portion provided between the moving blade and the stator in the axial direction and rotatably supporting the rotation shaft, and a frame. The frame includes a motor housing portion housing the stator, a bearing housing portion housing the bearing portion, a wall formed between the motor housing portion and the bearing housing portion and facing the moving blade, and a hole passing through the wall. The electric blower further has a first air path outside the frame, and a second air path inside the frame. An air volume in the first air path is larger than an air volume in the second air path.

According to the present invention, since the rotation shaft is rotatably supported by the bearing portion disposed between the moving blade and the stator, a center of the rotation shaft, a center of the stator, and a center of the bearing can be matched with each other. Thus, it is possible to inhibit the whirling caused by the centrifugal force. In addition, heat generated by the motor is efficiently dissipated by air flowing through the second air path provided inside the frame.

DETAILED DESCRIPTION

Embodiments of the present invention will be described in detail below with reference to the drawings. In this regard, these embodiments do not limit the present invention.

Embodiment 1

(Configuration of Electric Blower 200)

Figure 1:
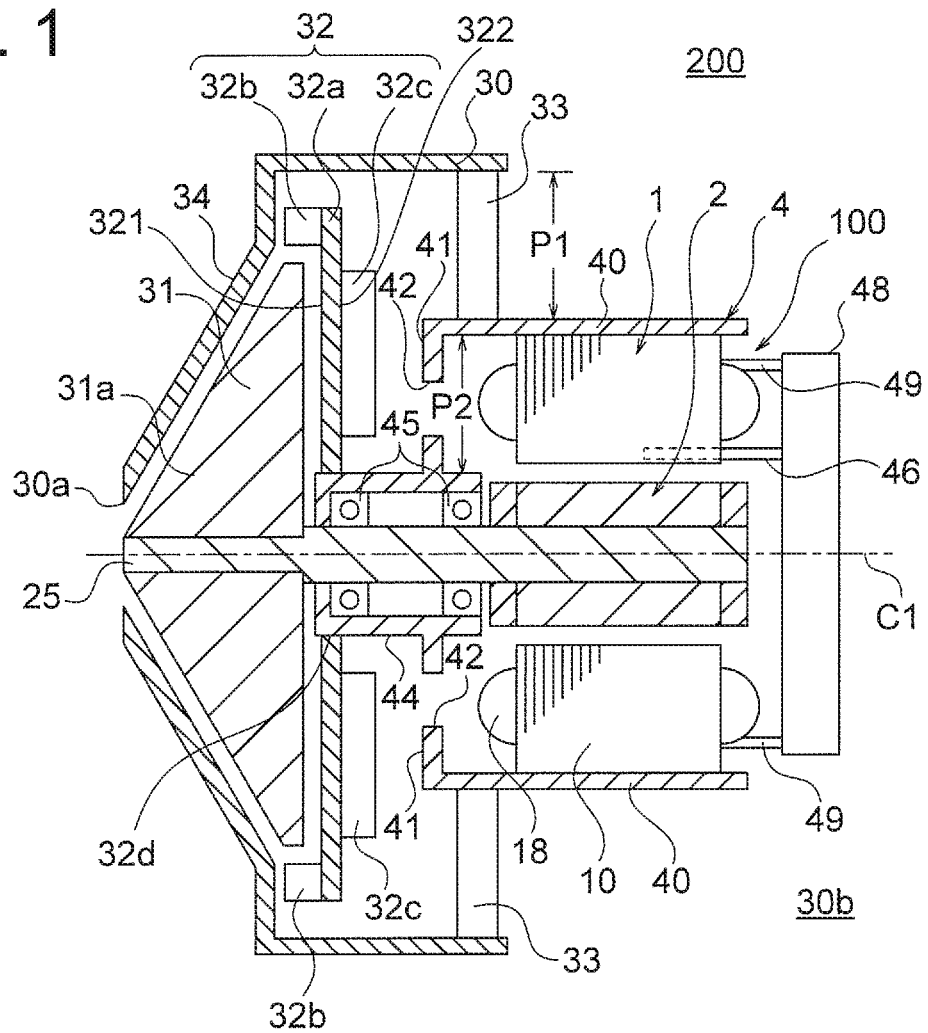
FIG. 1 is a longitudinal sectional view illustrating an electric blower according to Embodiment 1.

FIG. 1 is a longitudinal sectional view illustrating an electric blower 200 according to Embodiment 1 of the present invention. The electric blower 200 includes a motor 100 including a rotation shaft 25, a moving blade (fan) 31 mounted at one end side of the rotation shaft 25 of the motor 100, a stationary blade 32 disposed adjacent to the moving blade 31, and a housing 30 housing these components.

A direction of an axis C1 which is a central axis of the rotation shaft 25 will be referred to as the "axial direction" hereinafter. A circumferential direction about the axis C1 will be referred to as a "circumferential direction" hereinafter. A radial direction about the axis C1 will be referred to as a "radial direction" hereinafter. A sectional view taken in a plane parallel to the axial direction will be referred to as a "longitudinal sectional view" hereinafter. A sectional view taken in a plane perpendicular to the axial direction will be referred to as a "cross sectional view" hereinafter.

The motor 100 is a permanent magnet synchronous motor and is a single-phase motor driven by an inverter. The motor 100 includes a motor frame (also simply referred to as a frame) 4, a stator 1 fixed in the motor frame 4, a rotor 2 disposed inside the stator 1, and a rotation shaft 25 fixed at the center of the rotor 2. A specific configuration of the motor 100 will be described later.

Figure 2:
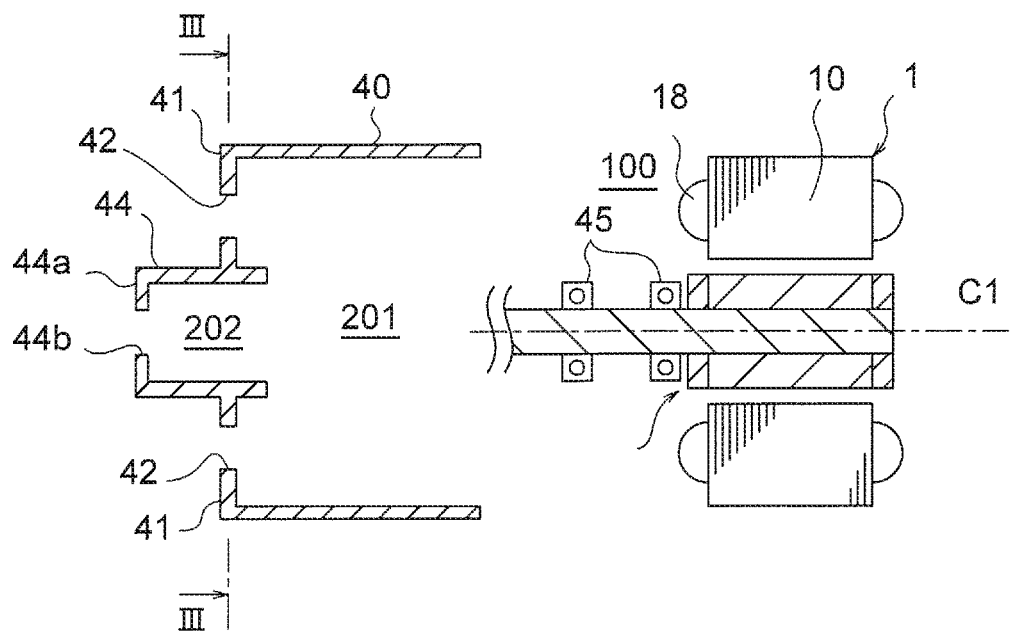
FIG. 2 is a schematic view illustrating a frame and a motor of the electric blower according to Embodiment 1.

FIG. 2 is a schematic view illustrating the motor frame 4 and the motor 100. The motor frame 4 includes a motor housing portion (that is, a peripheral wall) 40, and a bearing housing portion 44 formed on the motor housing portion 40 on the moving blade 31 side. Both the motor housing portion 40 and the bearing housing portion 44 have cylindrical shapes about the axis C1. An interior of the motor housing portion 40 serves as a stator insertion space 201 into which the stator 1 is inserted.

An outer diameter of the bearing housing portion 44 is smaller than an outer diameter of the motor housing portion 40. An interior of the bearing housing portion 44 serves as a bearing insertion space 202 into which bearings 45 are inserted. The bearing housing portion 44 includes a wall 44a on the moving blade 31 side, and a hole 44b through which the rotation shaft 25 passes is formed in the wall 44a.

Two bearings 45 are mounted in the bearing housing portion 44, and serve as a bearing portion. The bearings 45 have outer rings fitted into the bearing housing portion 44, and inner rings into which the rotation shaft 25 is fitted by press fitting. The two bearings 45 are disposed apart from each other in the axial direction. A sleeve or the like may be disposed between the two bearings 45.

A wall 41 is formed between the motor housing portion 40 and the bearing housing portion 44. In this case, the wall 41 extends in a direction perpendicular to the axis C1. Holes 42 through which air passes in the axial direction are formed in the wall 41.

Figure 3:
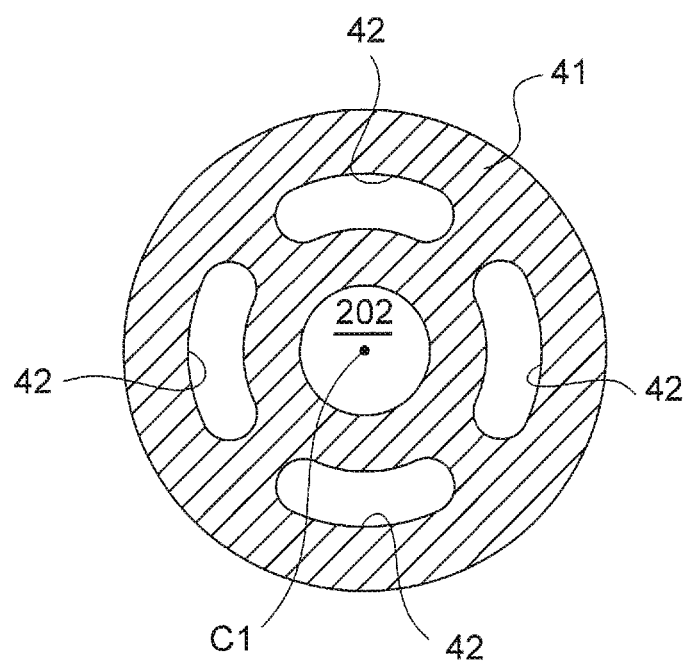
FIG. 3 is a sectional view taken along a line III-III in FIG. 3 as seen in a direction indicated by arrows.

FIG. 3 is a sectional view taken along a line III-III illustrated in FIG. 2. The holes 42 are provided for guiding an airflow generated by the moving blade 31 into the motor frame 4, as will be described later. In the example illustrated in FIG. 3, four holes 42 are formed in the circumferential direction, and each of the holes 42 has an arc shape about the axis C1. However, the holes 42 are not limited to this shape and this number.

Figure 4:
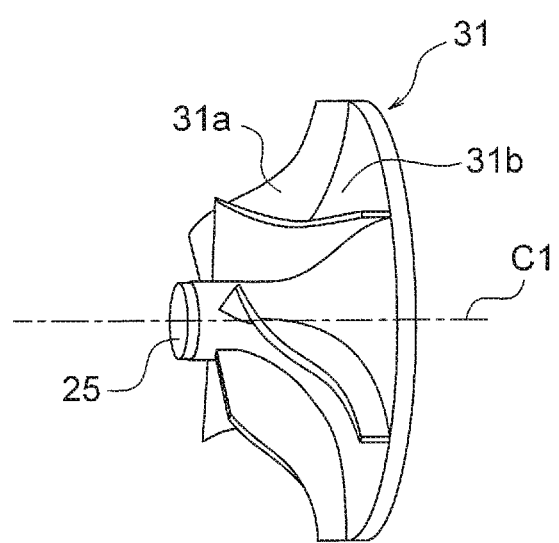
FIG. 4 is a perspective view illustrating a moving blade according to Embodiment 1.

FIG. 4 is a perspective view illustrating an example in which the moving blade 31 is implemented as a mixed-flow fan. The moving blade 31 illustrated in FIG. 4 includes a plurality of vanes 31a arranged on a surface of a hub 31b having a conical shape about the axis C1. The moving blade 31 has an inclination with respect to the axial direction, and generates an airflow directed outward in the radial direction. The moving blade 31 is not limited to the mixed-flow fan, and may be, for example, a turbofan.

With reference to FIG. 1 again, the stationary blade 32 includes a disk-shaped main plate 32a, a plurality of vanes 32b formed on a first surface 321 of the main plate 32a on the moving blade 31 side, and a plurality of air guide plates 32c formed on a second surface 322 of the main plate 32a on a side opposite to the moving blade 31. The stationary blade 32 includes a hole 32d at its center in the radial direction, and the bearing housing portion 44 is fitted into the hole 32d. The stationary blade 32 is fixed by, for example, bonding or screwing.

Figures 5A, 5B, 5C:
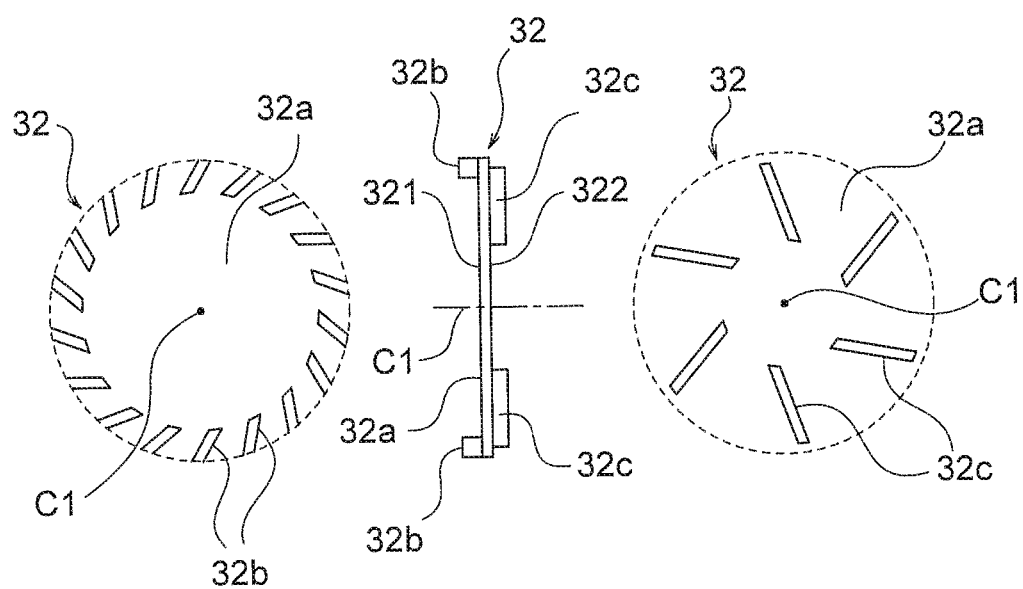
FIG. 5(A) is a diagram illustrating vanes of a stationary blade according to Embodiment 1.
FIG. 5(B) is a side view illustrating the stationary blade.
FIG. 5(C) is a diagram illustrating air guide plates of the stationary blade.

FIG. 5(A) is a diagram illustrating shapes and arrangement of the vanes 32b of the stationary blade 32. FIG. 5(B) is a side view of the stationary blade 32. FIG. 5(C) is a diagram illustrating shapes and arrangement of the air guide plates 32c of the stationary blade 32. In this regard, both FIGS. 5(A) and 5(C) illustrate the shapes and arrangement as seen from the side of the moving blade 31.

The vanes 32b are arranged at equal intervals in the circumferential direction, and each vane 32b extends in a direction inclined with respect to the radial direction, as illustrated in FIGS. 5(A) and 5(B). The vanes 32b are formed in the outer circumferential region of the first surface 321, and located on an outer side of the moving blade 31 (FIG. 4) in the radial direction. The vanes 32b have a function to rectify an airflow generated by the rotation of the moving blade 31.

The air guide plates 32c are arranged at equal intervals in the circumferential direction, and each air guide plate 32c extends in a direction inclined with respect to the radial direction, as illustrated in FIGS. 5(B) and 5(C). A direction in which the air guide plate 32c is inclined is opposite to a direction in which the vane 32b is inclined. The air guide plates 32c extend inward in the radial direction with respect to the vanes 32b. The air guide plates 32c have a function to guide the airflow, which is rectified by the vanes 32b, inward in the radial direction toward the motor frame 4.

With reference to FIG. 1 again, the electric blower 200 has a cantilevered structure in which the rotation shaft 25 is supported by the two bearings 45 disposed between the moving blade 31 and the stator 1 in the axial direction. In other words, the electric blower 200 has a structure in which the center of the rotation shaft 25, the center of the stator 1, and the centers of the bearings 45 are accurately matched with each other. The number of bearings 45 is not limited to two, and may be three or more.

The housing 30 includes a fan cover 34 formed along the moving blade 31, and a suction port 30a facing a center of the moving blade 31 in the radial direction. The housing 30 further includes frame support portions 33 supporting the motor frame 4. In this example, a plurality of frame support portions 33 are arranged in a radial pattern about the axis C1. The housing 30 opens on a side opposite to the fan cover 34, and serves as an exhaust port 30b.

The electric blower 200 includes a first air path P1 provided outside the motor frame 4, and a second air path P2 provided inside the motor frame 4. The first and second air paths P1 and P2 are paths (that is, air paths) through which air flowing into the housing 30 through the suction port 30a flows. Air flowing through the first air path P1 is directly exhausted through the exhaust port 30b. In contrast, air flowing through the second air path P2 passes through the motor 100 in the axial direction.

The stator 1 and the rotor 2 are disposed in the second air path P2 inside the motor frame 4, and serve as airflow resistors. Thus, the first air path P1 provided outside the motor frame 4 and exhibiting a low air path resistance is used as a main air path.

A board 48 for controlling driving of the motor 100 is disposed on a side of the motor 100 opposite to the moving blade 31. The board 48 is fixed to the motor frame 4 or the stator 1 via fixing members 49. The board 48 includes a sensor guide 46 for guiding lead wires of a sensor 7 (to be described later) of the motor 100.

(Configuration of Motor 100)

Figure 6:
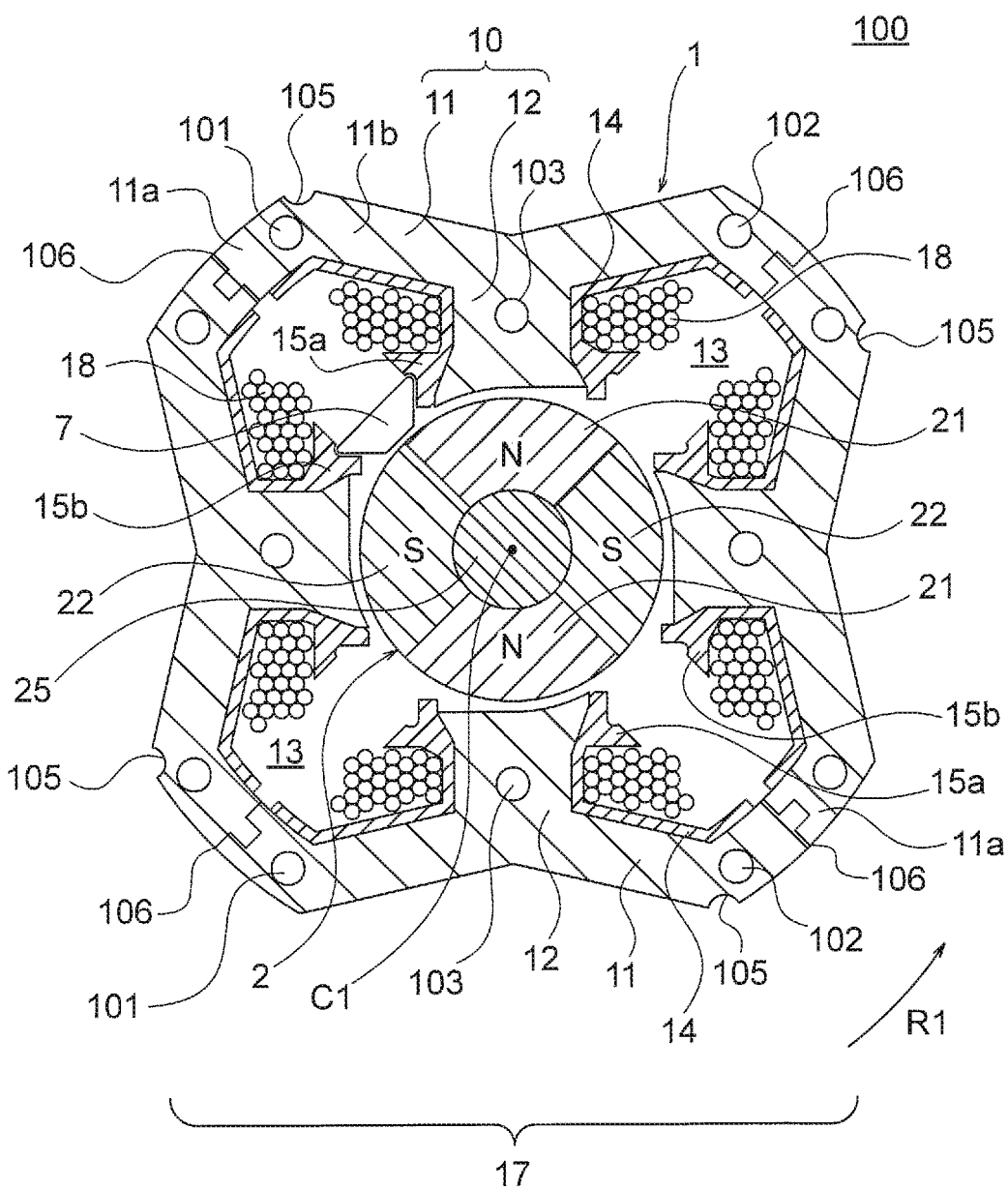
FIG. 6 is a cross sectional view illustrating a motor according to Embodiment 1.

FIG. 6 is a sectional view illustrating the motor 100 according to Embodiment 1. The motor 100 includes the rotor 2, and the stator 1 provided to surround the rotor 2, as described above. The rotor 2 rotates counterclockwise in the figure about the axis C1. A direction in which the rotor 2 rotates is indicated by an arrow R1.

The rotor 2 includes a rotation shaft 25, and permanent magnets 21 and 22 fixed to a circumference of the rotation shaft 25. The permanent magnets 21 and 22 are arranged at equal intervals in the circumferential direction, and each of the permanent magnets 21 and 22 form a magnetic pole. Outer circumferential surfaces of the permanent magnets 21 form, for example, north poles, and outer circumferential surfaces of the permanent magnets 22 form, for example, south poles. However, the magnetic poles of the magnets 21 and 22 may be reversed.

In this example, two permanent magnets 21 and two permanent magnets 22 are alternately arranged in the circumferential direction. In other words, the rotor 2 has four magnetic poles. However, the number of magnetic poles of the rotor 2 is not limited to four, and need only be two or more.

The stator 1 is disposed on an outer side of the rotor 2 in the radial direction via an air gap. The stator 1 includes a stator core 10, insulating portions 14, and coils 18. The stator core 10 is formed by a plurality of stack elements stacked in the axial direction and fixed together by crimping portions 101, 102, and 103. In this example, the stack elements are electromagnetic steel sheets, and each electromagnetic steel sheet has a sheet thickness of, for example, 0.25 mm.

The stator core 10 includes a yoke 11 surrounding the rotor 2, and a plurality of teeth 12 extending from the yoke 11 in a direction toward the rotor 2 (that is, inward in the radial direction). The teeth 12 are arranged at equal intervals in the circumferential direction. The number of teeth 12 is equal to the number of magnetic poles of the rotor 2, and is four in this example.

Slots 13 are formed each between two teeth 12 adjacent to each other in the circumferential direction in the stator core 10. The insulating portion 14 made of an insulating resin is provided in each slot 13. The coils 18 are wound around the teeth 12 via the insulating portions 14.

In the example illustrated in FIG. 6, the yoke 11 of the stator core 10 includes a plurality of arc-shaped back yokes 11a, and linear connecting yokes 11b located on an inner side in the radial direction with respect to the back yokes 11a. The back yokes 11a are outermost portions of the stator 1 in the radial direction, and are arranged at equal intervals in the circumferential direction.

The number of back yokes 11a is equal to the number of teeth 12, and is four in this example. The teeth 12 are each located between two back yokes 11a adjacent to each other in the circumferential direction. Outer circumferential surfaces of the back yokes 11a are fitted to an inner circumferential surface of the motor housing portion 40 of the motor frame 4 (FIG. 1).

The connecting yokes 11b extend to connect the back yokes 11a and the teeth 12 to each other. The connecting yoke 11b linearly extends so that the connecting yoke 11b is displaced inward in the radial direction as a distance from the back yoke 11a increases. The tooth 12 extends toward the rotor 2 from a portion (that is, an innermost portion of the yoke 11 in the radial direction) where connecting yokes 11b adjacent to each other in the circumferential direction are connected to each other in a V shape.

A split surface (that is, a split fitting portion) 106 is formed at a center of each back yoke 11a in the circumferential direction. The stator core 10 is divided into a plurality of blocks, that is, split cores 17 each including one tooth 12 by the split surfaces 106 formed on the back yokes 11a. In this example, the stator core 10 is divided into four split cores 17.

The split surfaces 106 include convex portions or concave portions. The convex portion of the split surface 106 of one of two split cores 17 adjacent to each other in the circumferential direction is fitted into the concave portion of the split surface 106 of the other of the split cores 17.

The stator core 10 is integrally fixed by the crimping portions 101, 102, and 103. The crimping portions 101 and 102 are formed on the yoke 11, and the crimping portions 103 are formed on the teeth 12. The crimping portions 101 and 102 are desirably formed at positions as close as possible to the split surfaces 106 on the yoke 11, that is, formed on the back yokes 11a.

Fixing recesses 105 which are grooves elongated in the axial direction are formed on the outer circumferences of the back yokes 11a of the yoke 11. In a state where the stator core 10 is fitted into the motor housing portion 40 (FIG. 1) of the motor frame 4, parts of the motor housing portion 40 are deformed by being pressed from the outer circumferential side, and are fitted into the fixing recesses 105. This prevents rotation of the stator 1 in the motor frame 4. A configuration where no fixing recess 105 is provided is also employable.

In the example illustrated in FIG. 6, an end portion of each tooth 12 has a shape asymmetrical with respect to a straight line in the radial direction passing through the center of the tooth 12 in a widthwise direction. However, the end portion of the tooth 12 is not limited to this shape, and may have a symmetrical shape.

Sensor fixing portions 15a and 15b are provided on both sides of the end portion of each tooth 12 in the circumferential direction. The sensor fixing portions 15a and 15b project in the circumferential direction from the end portion of each tooth 12. The sensor fixing portions 15a and 15b are formed integrally with the insulating portion 14. A sensor 7 for detecting a magnetic field generated by the rotor 2 is held between one pair of sensor fixing portions 15a and 15b among four pairs of sensor fixing portions 15a and 15b of the stator 1.

The sensor 7 is formed by a Hall effect element integrated with a resin package, and lead wires are drawn from one end surface of the sensor 7 in the axial direction. In order to detect a magnetic field generated by the rotor 2, the sensor 7 is disposed to face the outer circumferential surface of the rotor 2.

When the motor 100 is assembled, the insulating portion 14 and the sensor fixing portions 15a and 15b are fitted to each split core 17 (FIG. 6). Then, the coils 18 are wound around the insulating portions 14, and then four split cores 17 are combined with each other to obtain the stator 1. The sensor 7 is inserted into between the sensor fixing portions 15a and 15b between two teeth 12.

Figure 7:
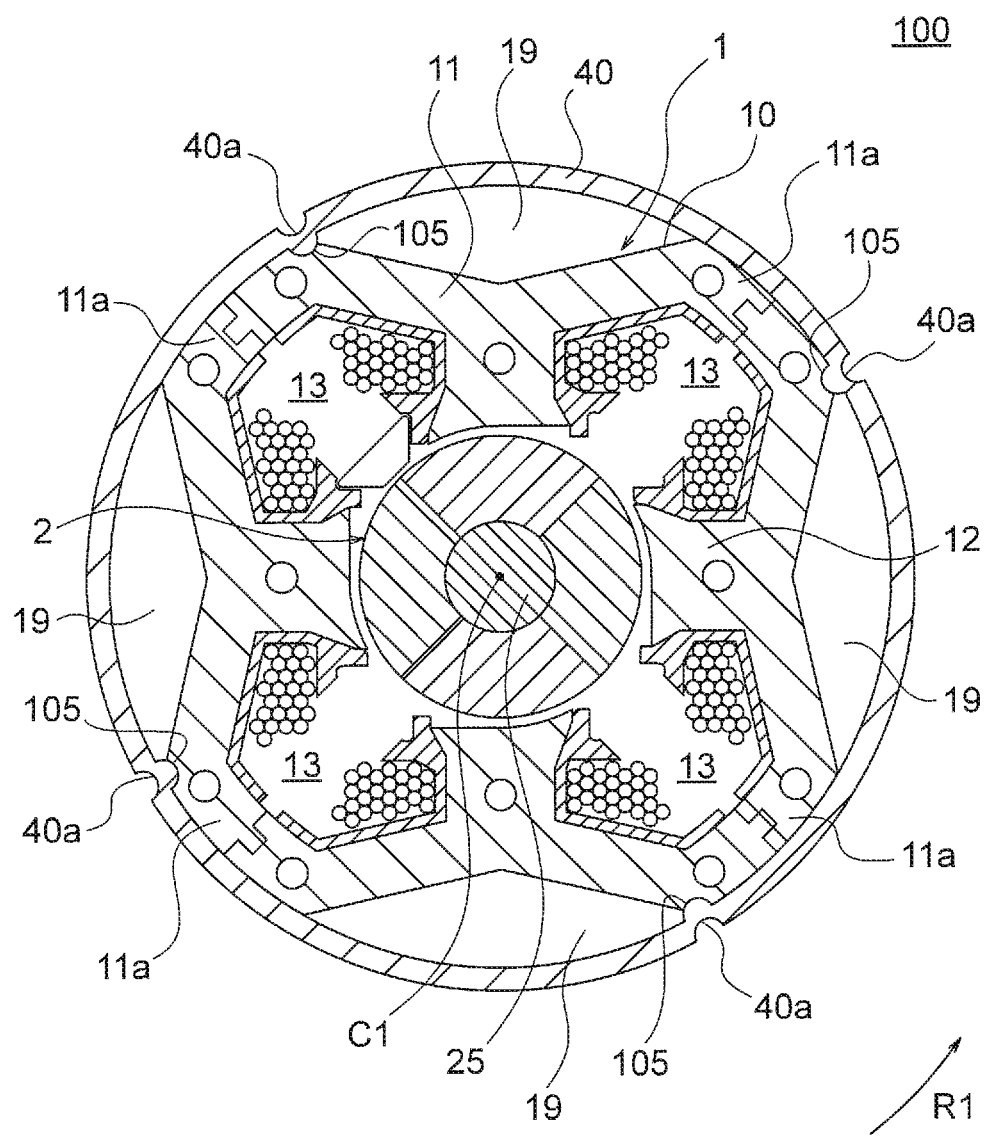
FIG. 7 is a cross sectional view illustrating a state where the motor according to Embodiment 1 is fitted into the frame.

FIG. 7 is a diagram illustrating a state where the motor 100 as configured above is mounted in the motor frame 4 (FIG. 1). When the motor 100 is mounted in the motor housing portion 40, the outer circumferential surfaces of the back yokes 11a of the stator 1 are fitted to the inner circumferential surface of the motor housing portion 40. Since the stator 1 includes the fixing recesses 105, portions of the motor housing portion 40 corresponding to the fixing recesses 105 are recessed (as indicated by reference numerals 40a) by application of external force, and the portions 40a are fitted into the fixing recesses 105. Thus, the motor 100 can be prevented from being displaced in the circumferential direction.

(Function)

Figure 8:
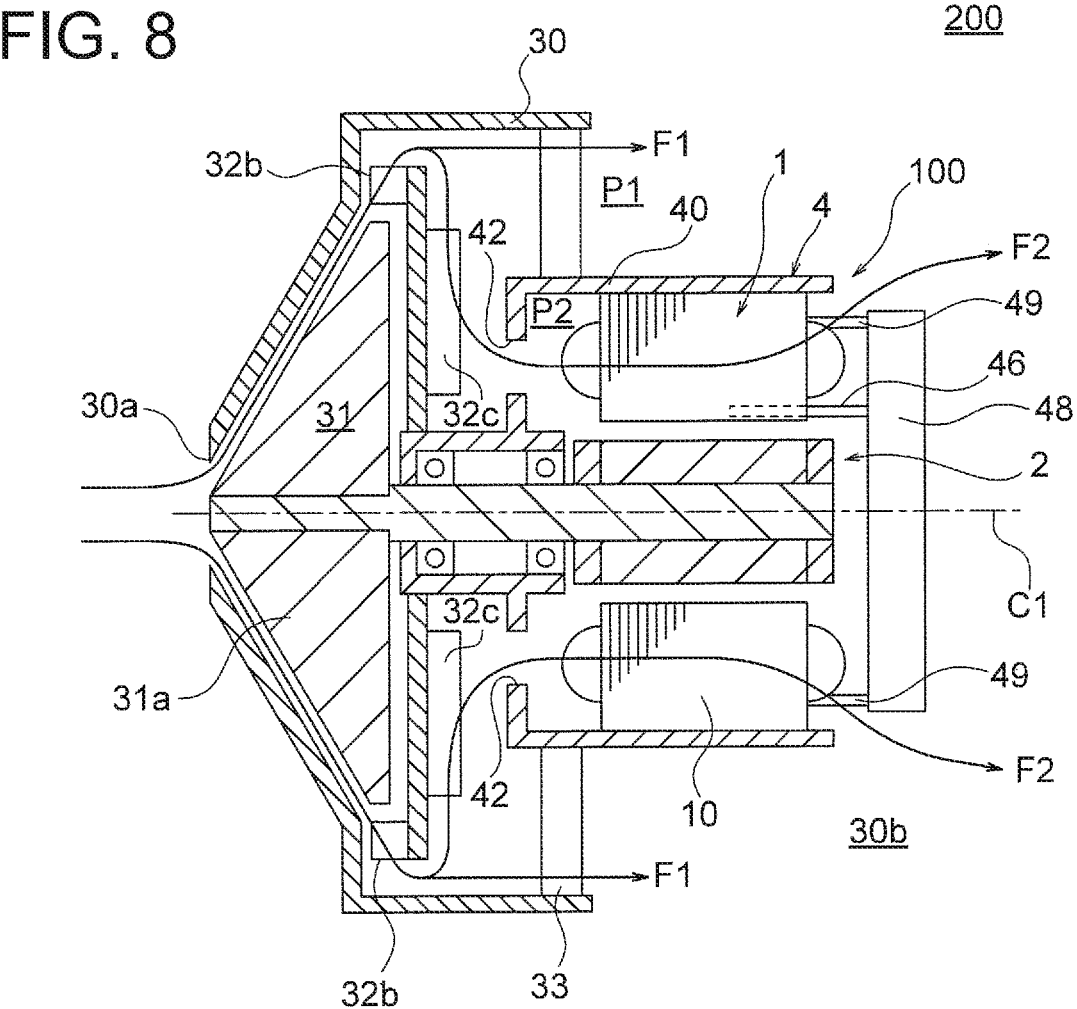
FIG. 8 is a schematic view illustrating an airflow in the electric blower according to Embodiment 1.

A function of the electric blower 200 according to this Embodiment 1 will be described below. FIG. 8 is a diagram illustrating an airflow in the electric blower 200. When the motor 100 rotates by application of current to the coils 18, the rotation shaft 25 rotates, and the moving blade 31 rotates. When the moving blade 31 rotates, air flows through the suction port 30a into the housing 30.

Figure 9A:
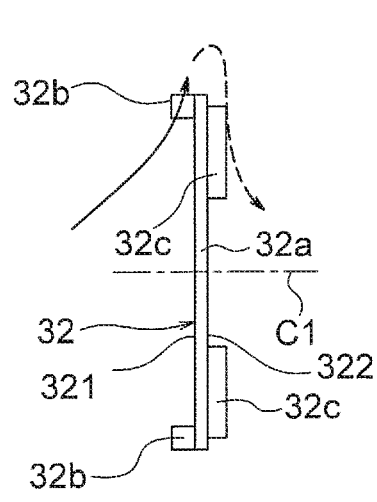
FIGS. 9(A) and 9(B) are a side view and a front view illustrating an air guiding function exhibited by the stationary blade of the electric blower according to Embodiment 1.
Figure 9B:
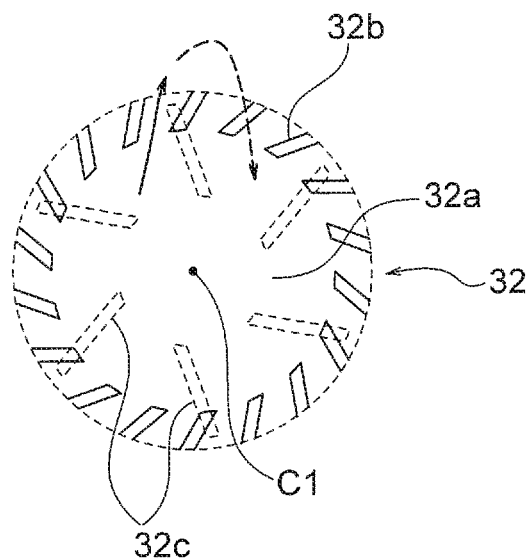

FIG. 9(A) is a side view illustrating a function of the stationary blade 32, and FIG. 9(B) is a front view illustrating the function as seen from the moving blade 31 side. As illustrated in FIGS. 9(A) and 9(B), the vanes 32b of the stationary blade 32 rectify air (indicated by solid arrows) flowing along the moving blade 31, and guide the air outward in the radial direction. The air guide plates 32c of the stationary blade 32 guide the air passing through the vanes 32b inward in the radial direction as indicated by dashed arrows.

Thus, a part of the air passing through the stationary blade 32 flows in the axial direction through the first air path P1 outside the motor frame 4 as indicated by arrows F1 in FIG. 8. Another part of the air passing through the stationary blade 32 is guided inward in the radial direction by the air guide plates 32c of the stationary blade 32, flows into the motor frame 4 through the holes 42, and flows through the second air path P2 in the axial direction as indicated by arrows F2.

The air flowing into the motor frame 4 flows in the axial direction through gaps 19 between the stator 1 and the motor housing portion 40 illustrated in FIG. 7, the interior of the slots 13 in the stator 1, and the air gap between the stator 1 and the rotor 2. Therefore, heat generated by the coils 18 when the motor 100 is driven can be efficiently dissipated by the air flowing through the second air path P2.

Figure 10:
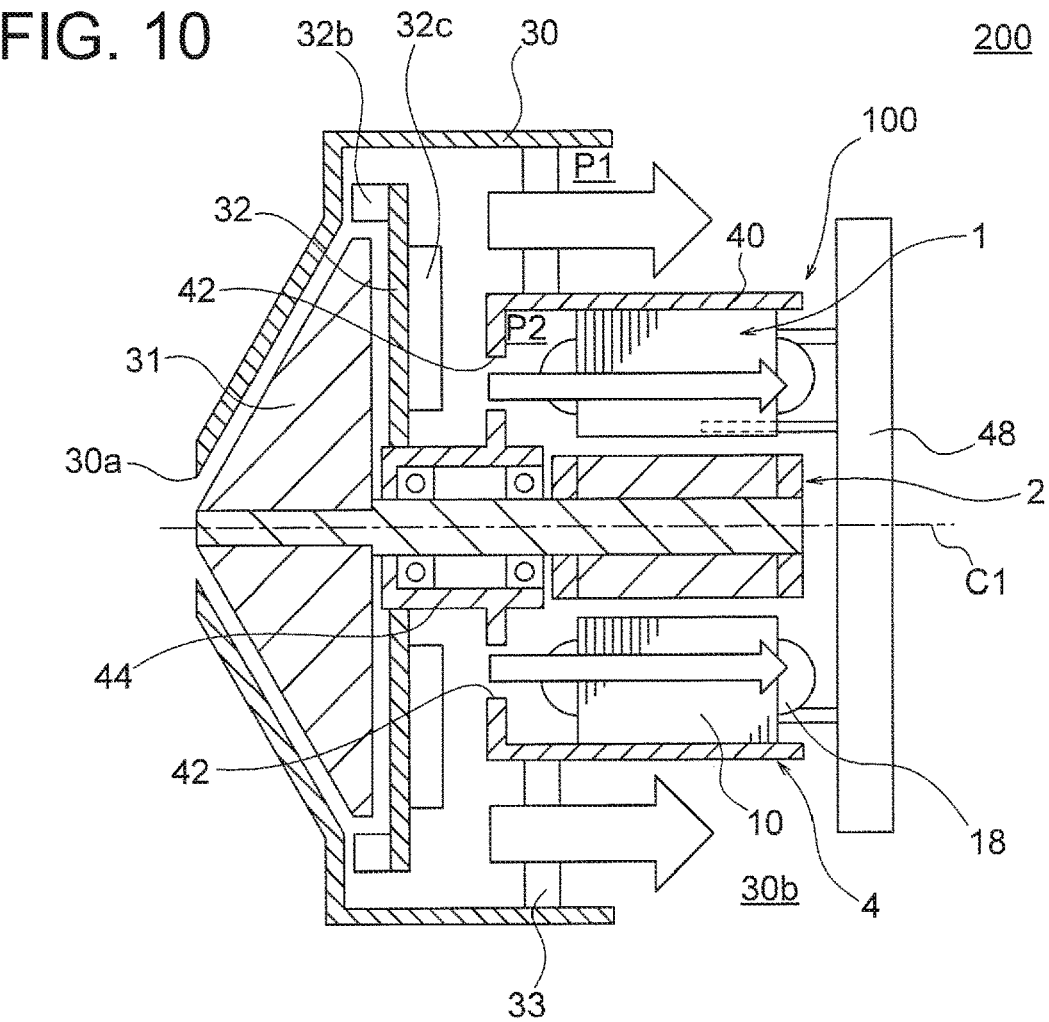
FIG. 10 is a schematic view illustrating an air volume in a first air path and an air volume in a second air path according to Embodiment 1.

FIG. 10 is a schematic view for explaining air volumes in the first air path P1 and the second air path P2. The air volume in the first air path P1 and the air volume in the second air path P2 are expressed by thicknesses of arrows illustrated in FIG. 10.

As described above, the stator 1 and the rotor 2 are disposed in the second air path P2, and serve as airflow resistors. Thus, the first air path P1 exhibiting a low air path resistance is used as the main air path. In other words, air efficiency is enhanced by making large the air volume in the first air path P1, and heat dissipation characteristics of the motor 100 is enhanced by supplying air to the second air path P2 at the smaller air volume than in the first air path P1. In this regard, the air efficiency means a ratio of an air output to a power input to the motor 100, and the air output is calculated as the product of the air volume and the static pressure.

The main air path means an air path in which the air volume is larger for the same rotation speed. This is determined by comparison between the air volume in the second air path P2 when the first air path P1 is completely closed, and the air volume in the first air path P1 when the second air path P2 is completely closed. In this example, the first air path P1 serves as the main air path, as described above.

Figure 11:
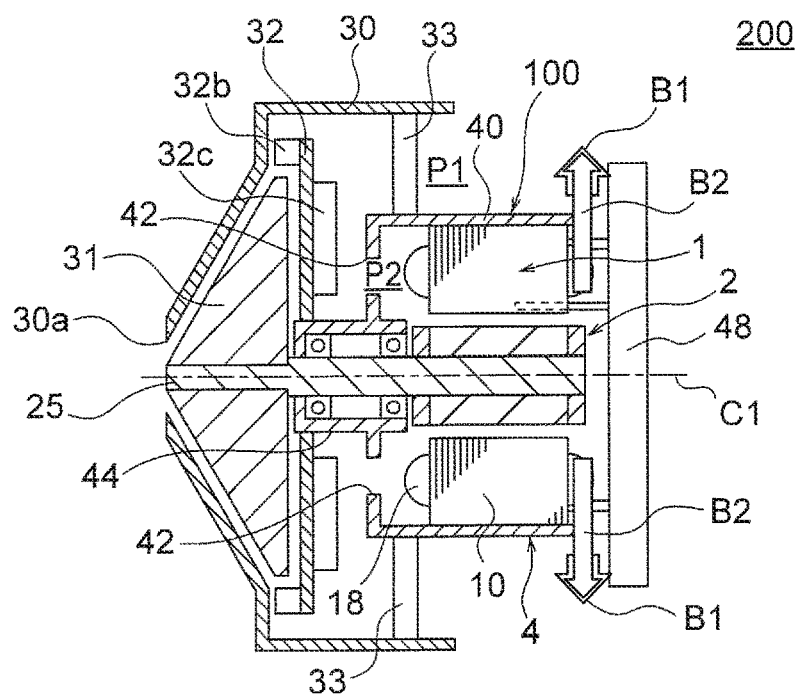
FIG. 11 is a schematic view illustrating an air path along a board in the electric blower according to Embodiment 1.

An arrangement for dissipating heat from the board 48 will be described below. FIG. 11 is a schematic view illustrating an air path along the board 48. Both of the air flowing through the first air path P1 and the air flowing through the second air path P2 blow against a surface of the board 48 to change directions, and flow outward in the radial direction. The board 48 includes elements and patterns for controlling the motor 100, and generates heat when the motor 100 is driven. The heat can be dissipated by the air flowing along the surface of the board 48.

A distance by which the air from the first air path P1 flows outward in the radial direction along the surface of the board 48 is defined as B1. A distance by which the air from the second path P2 flows outward in the radial direction along the surface of the board 48 is defined as B2. Since the second air path P2 is located on an inner side of the first air path P1 in the radial direction, B1<B2 is satisfied.

Since the air efficiency of the electric blower 200 is determined by the air volume in the first air path P1 serving as the main air path, the air volume of the second air path P2 has little influence on the air efficiency. Thus, as heat dissipation from the board 48 is performed by the air flowing through the second air path P2, heat can be dissipated from the board 48 and the air efficiency can be enhanced. Furthermore, an air volume of the air blowing against the board 48 is not excessively large, and thus the board 48 can be prevented from being detached.

Figure 12:
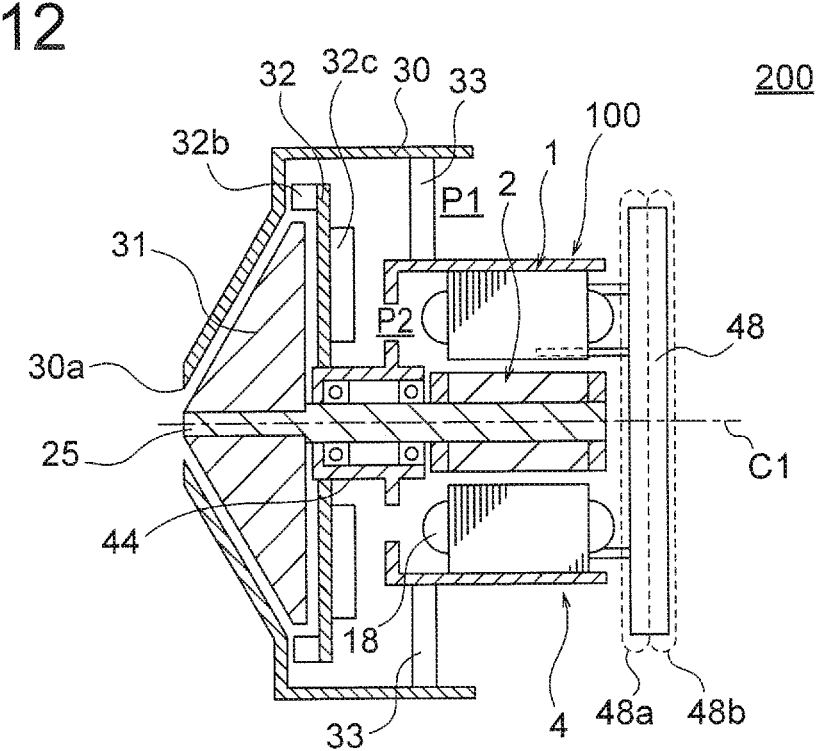
FIG. 12 is a schematic view illustrating a relationship between the board, and the first air path and the second air path according to Embodiment 1.

FIG. 12 is a schematic view illustrating a relationship between the board 48, and the first air path P1 and the second air path P2. The board 48 includes a first circuit region 48a on a side facing the motor 100, and a second circuit region 48b on a side opposite to the motor 100.

The first circuit region 48a includes elements and patterns for power supply to the motor 100, that is, elements and patterns in which a relatively high current (for example, 1 A or more) flows. The second circuit region 48b includes elements and patterns for controlling the motor 100, that is, elements and patterns in which a relatively low current (for example, on the order of 1 mA) flows.

Since the first circuit region 48a in which a relatively high current (for example, 1 A or more) flows generates a large amount of heat, heat can be efficiently dissipated by exposing the first circuit region 48a directly to the air flowing through the first air path P1 and the second air path P2.

A function of the split cores 17 will be described below. In Embodiment 1, since the stator core 10 is formed by the combination of split cores 17 (FIG. 6), an operation for fitting the insulating portions 14, and an operation for winding the coils 18 are easier than when the stator core 10 is an integrated core.

Generally, as a size of the motor 100 is reduced, it tends to be difficult to wind the coils 18, and a coil space factor decreases. However, when the stator core 10 is formed by the combination of split cores 17 (FIG. 6), the coils 18 can be wound at high density and the coil space factor can be enhanced, even if the size of the motor 100 is reduced.

Figure 13:
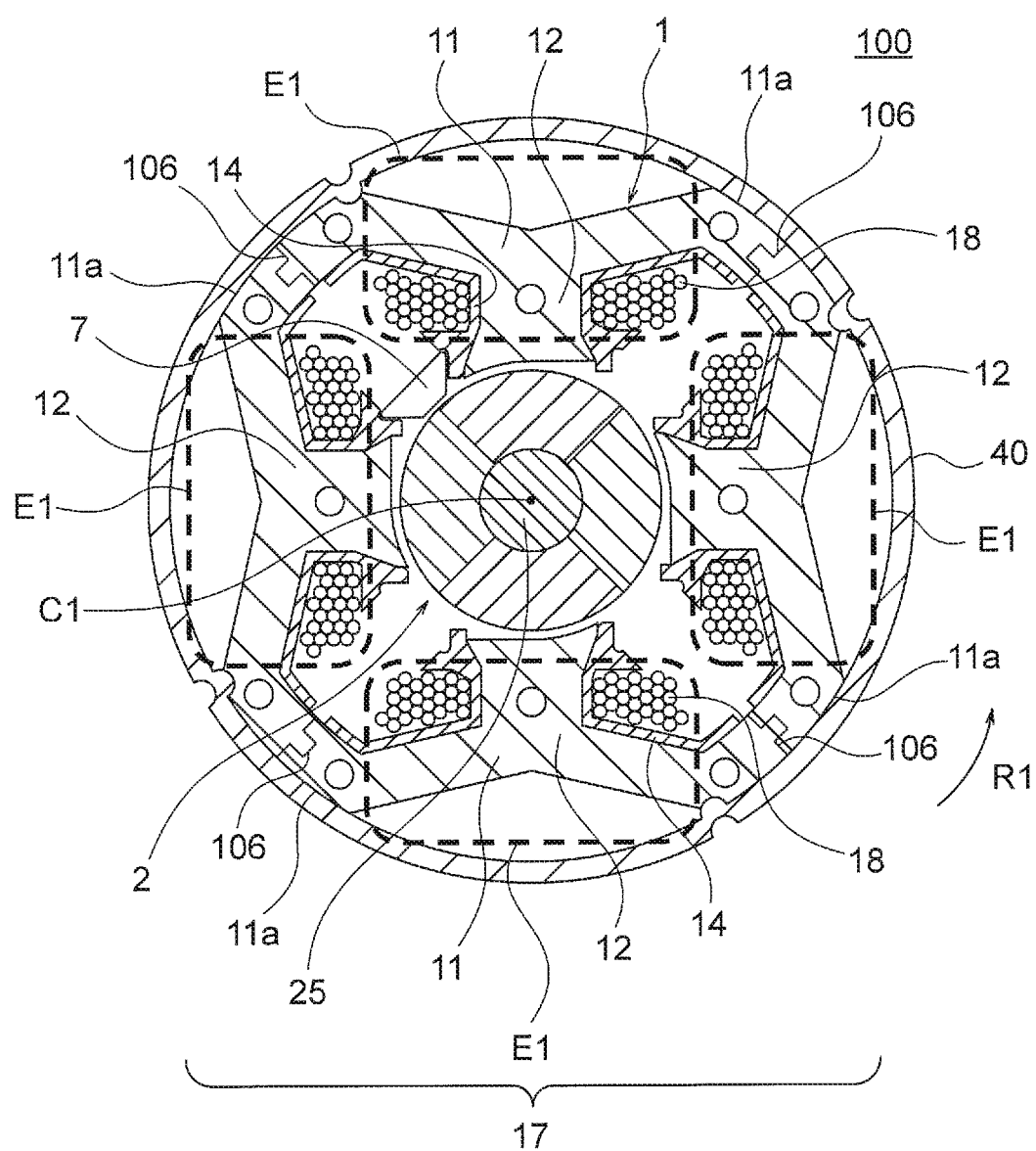
FIG. 13 is a schematic view illustrating exposed portions of a stator in the motor frame according to Embodiment 1.

Heat dissipation from the split surfaces 106 of the stator core 10 will be described herein. FIG. 13 is a schematic view for explaining exposed portions of the stator 1 in the motor frame 4. Portions of the stator 1 surrounded by broken lines E1 are covered with the insulating portions 14, and the coils 18 are wound in these portions. In contrast, portions (that is, parts of the back yokes 11a) of the stator 1 including the split surfaces 106 are not covered with the insulating portions 14, and the coils 18 are not wound in these portions. Thus, the portions including the split surfaces 106 are exposed in the second air path P2, and directly exposed to air.

The split surfaces 106 are formed by punching electromagnetic steel sheets using a mold, and strain (that is, punching strain) generated upon punching remains on the split surfaces 106. Since the punching strain reduces the magnetic permeability of the stator core 10, passage of magnetic flux through the split surface 106 locally generates loss, and heat is locally generated.

Thus, by exposing the split surfaces 106 of the stator 1 in the second air path P2 as illustrated in FIG. 13, heat locally generated due to the punching strain can be efficiently dissipated.

Figure 19:
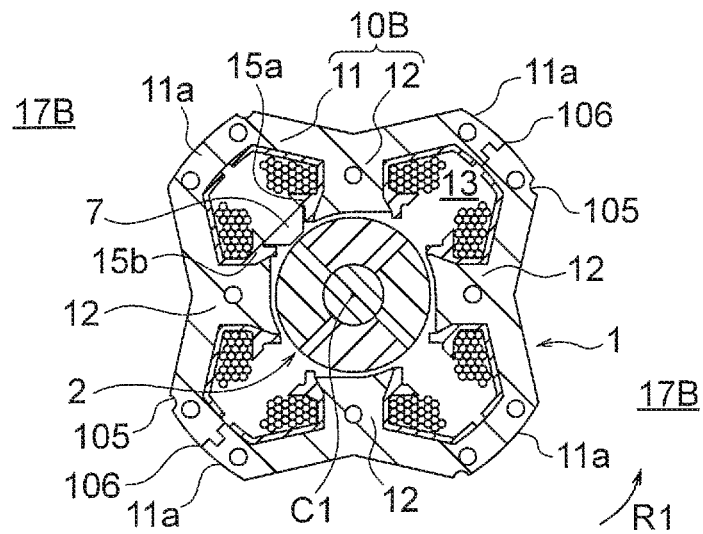
FIG. 19 is a cross sectional view illustrating a motor according to a Modification 1 of Embodiment 3.

The stator core 10 formed by the combination of split cores 17 is illustrated in FIG. 13. However, as illustrated in FIG. 19 to be described later, even in a stator core 10B (that is, a stator core 10B formed by a combination of joint cores) connected via thin portions (connecting portions) 112, heat locally generated due to the punching strain can be efficiently dissipated by exposing the thin portions 112 in the second air path P2.

The minimum sectional areas of the first air path P1 and the second air path P2 will be described below. The sectional area of the first air path P1 is minimum at a portion where the frame support portions 33 are provided in the housing 30.

Figure 14:
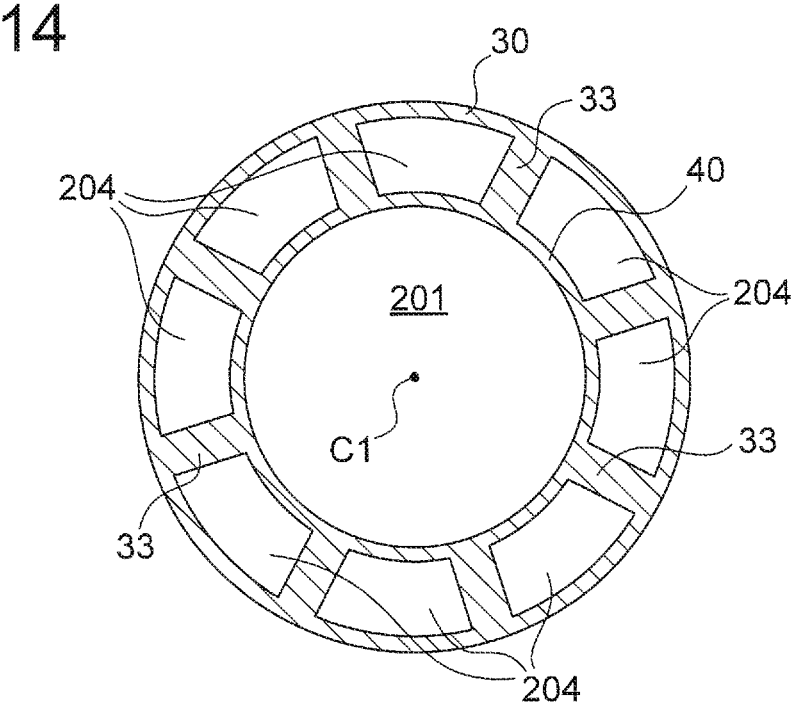
FIG. 14 is a cross sectional view illustrating a sectional structure of a housing according to Embodiment 1.

FIG. 14 is a cross sectional view of the housing 30 at the portion where the frame support portions 33 are provided. Eight frame support portions 33 are provided between the housing 30 and the motor housing portion 40 of the motor frame 4. The eight frame support portions 33 are formed in a radial pattern about the axis C1. Openings 204 through which air passes in the axial direction are formed between frame support portions 33 adjacent to each other in the circumferential direction. A sum of areas of the openings 204 is defined as S1.

A sectional area of the second air path P2 is minimum at the holes 42 of the motor frame 4. As illustrated in FIG. 3 described above, four holes 42 through which air passes in the axial direction are formed in the wall 41 of the motor frame 4. A sum of areas of the holes 42 is defined as S2.

In this Embodiment 1, the minimum sectional area S1 of the first air path P1 is larger than the minimum sectional area S2 of the second air path P2. This is because the first air path P1 is used as the main air path.

Figure 15:
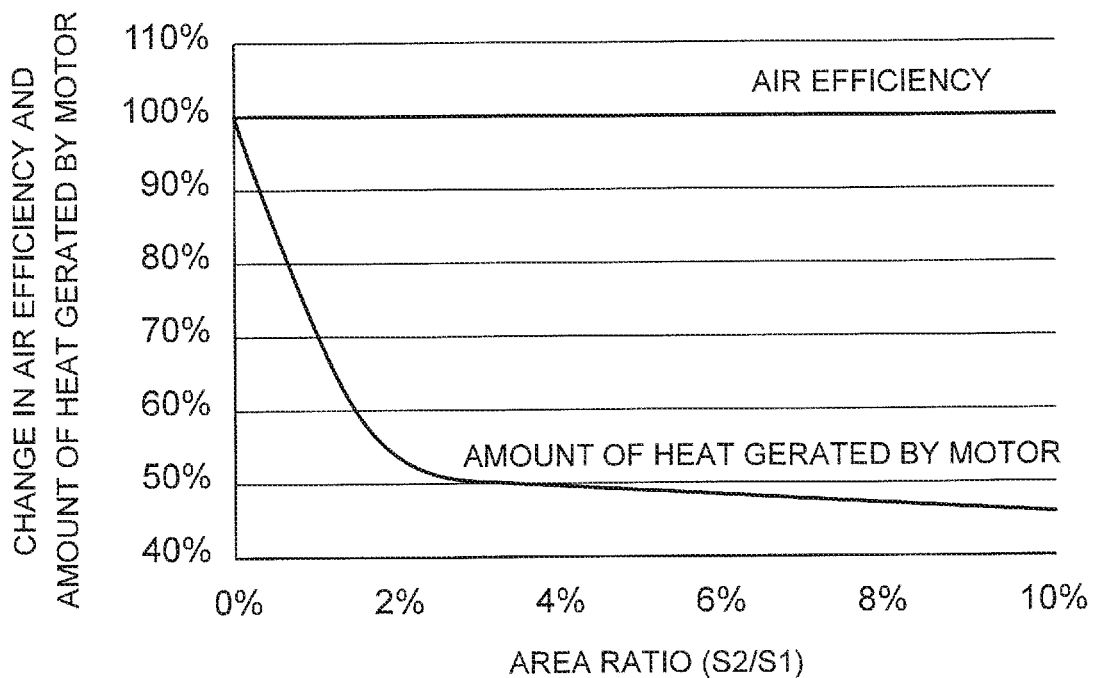
FIG. 15 is a graph illustrating changes in air efficiency and heat generation amount of the motor with respect to the area ratio.

FIG. 15 is a graph showing a relationship between a ratio (referred to as an area ratio S2/S1) of the minimum sectional area S2 of the second air path P2 to the minimum sectional area S1 of the first air path P1, and the air efficiency and the amount of heat generated by the motor 100.

From FIG. 15, it is understood that, as the area ratio S2/S1 increases, the amount of heat generated by the motor 100 decreases while the air efficiency remains unchanged. Furthermore, it is understood that in a range where the ratio S2/S1 is 2% or more, the amount of heat generated by the motor 100 decreases moderately. From this result, it is understood that the area ratio S2/S1 is desirably 2% or more in order to enhance the heat dissipation characteristics of the motor 100.

A structure for supporting the rotation shaft 25 will be described below. In order to reduce the size of the electric blower 200, it is necessary to increase the rotation speed of the motor 100. However, as the rotation speed of the motor 100 increases, the centrifugal force acting on the rotating portion of the motor 100 increases. A centrifugal force $P=mr\omega^2$ acts on each portion of the motor 100, where m represents a mass of each portion of the motor 100, r represents a distance thereto from the center of rotation of the motor 100, and $\omega$ represents a rotation speed of the motor 100.

For this reason, if the center of the rotation shaft 25, the center of the stator 1, and the centers of the bearings 45 are not accurately matched with each other, whirling may be caused by the centrifugal force, and may result in damage to the rotation shaft 25 or the bearings 45.

In this Embodiment 1, the rotation shaft 25 is rotatably supported by the two bearings 45 provided between the moving blade 31 and the stator 1 in the axial direction, as illustrated in FIG. 1. Therefore, positions of the centers of the two bearings 45 are not displaced from each other.

Since the stator 1 and the bearings 45 are supported by the common motor frame 4, assembly dimension error as in the case where the stator 1 and the bearings 45 are supported by separate members does not occur. As a result, the center of the rotation shaft 25, the center of the stator 1, and the centers of the bearings 45 can be accurately matched with each other, and thus whirling due to the centrifugal force can be prevented. Furthermore, an influence of an electromagnetic force acting between the stator 1 and the rotor 2 on the rotation of the rotor 2 can be inhibited.

Effects of Embodiment

As described above, in Embodiment 1, the rotation shaft 25 is supported by the bearings 45 disposed between the moving blade 31 and the stator 1 in the axial direction. The stator 1 is housed in the motor housing portion 40 of the motor frame 4, and the bearings 45 are housed in the bearing housing portion 44. The holes 42 are formed in the motor frame 4, and the first air path P1 is provided outside the motor frame 4 and the second air path P2 is provided inside the motor frame 4. The air volume in the first air path P1 is larger than the air volume in the second air path P2.

With this configuration, even if the rotation speed of the motor 100 increases, whirling due to the centrifugal force can be prevented. Furthermore, heat generated by the motor 100 can be efficiently dissipated by the air flowing through the second air path P2.

Since the air guide plates 32c is provided on the stationary blade 32, the air passing through the moving blade 31 can be efficiently guided to the second air path P2, and the heat dissipation characteristics of the motor 100 can be enhanced.

Figure 16:
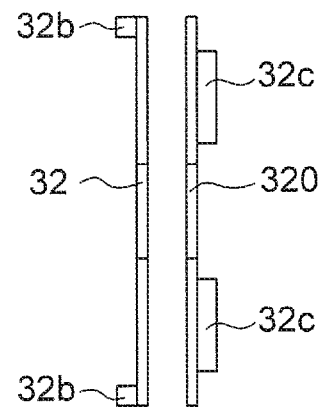
FIG. 16 is a side view illustrating another configuration example of the air guide plates according to Embodiment 1.

In this Embodiment 1, the airflow generated by the moving blade 31 is guided to the second air path P2 by the air guide plates 32c provided on the stationary blade 32 (FIG. 1). However, the air guide plates 32c are not necessarily provided on the stationary blade 32, and may be provided on a plate-like member 320 different from the stationary blade 32, as illustrated in FIG. 16. The plate-like member 320 illustrated in FIG. 16 includes the air guide plates 32c on a surface opposite to a side facing the stationary blade 32. The arrangement of the air guide plates 32c is as described above with reference to FIG. 5.

Embodiment 2

Figure 17:
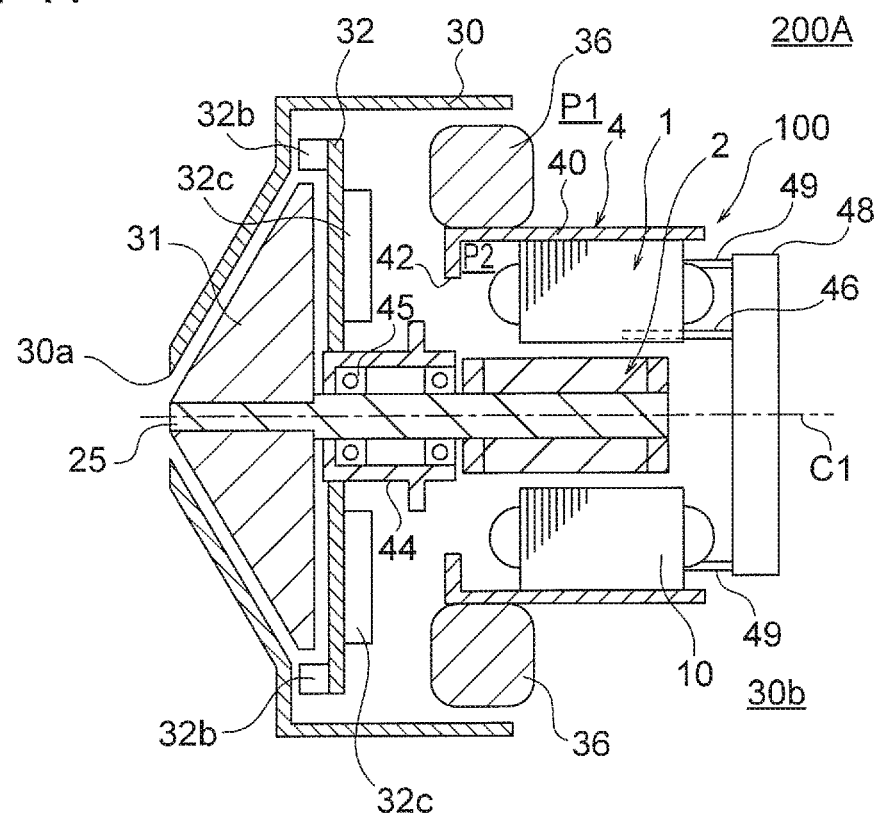
FIG. 17 is a longitudinal sectional view illustrating an electric blower according to Embodiment 2.

Embodiment 2 of the present invention will be described next. FIG. 17 is a longitudinal sectional view illustrating an electric blower 200A according to Embodiment 2. In the electric blower 200A according to Embodiment 2, an airflow resistor 36 provides resistance to an airflow (that is, increase a pressure loss) is provided in the first air path P1. The airflow resistor 36 acts as an air guide member for guiding air, which flows into the housing 30 by the moving blade 31, to the second air path P2.

The airflow resistor 36 is fixed to the outer circumferential surface of the motor frame 4, and a clearance is formed between the airflow resistor 36 and the inner peripheral surface of the housing 30. The airflow resistor 36 may have any form as long as the airflow resistor provides resistance to the air flowing through the first air path P1. A porous body is desirable in order not to completely cut off the airflow. In addition, when the airflow resistor 36 is formed of a porous elastic body such as a sponge, the airflow resistor 36 can be fixed so as to be wound around the outer circumferential surface of the motor frame 4, and thus assembly is facilitated. Therefore, it is desirable to use, for example, a soundproofing material as the airflow resistor 36.

When the moving blade 31 rotates by driving of the motor 100, air flows through the suction port 30a into the housing 30. Since the airflow resistor 36 is disposed in the first air path P1, a large part of the air passing through the stationary blade 32 flows toward the second air path P2, and flows into the motor frame 4 through the holes 42. Thus, the air passes through the motor 100 in the axial direction, and heat generated by the motor 100 is dissipated.

The electric blower 200A according to Embodiment 2 is configured in the same manner as the electric blower 200 according to Embodiment 1, except that the airflow resistor 36 is provided in the first air path P1.

In this Embodiment 2, the airflow resistor 36 in the first air path P1 guides the air flowing into the housing 30 to the second air path P2, and thus heat generated by the coils 18 when the motor 100 is driven can be efficiently dissipated by the air flowing through the second air path P2, as in Embodiment 1.

When the airflow resistor 36 is provided in the first air path P1, the air guide plates 32c of the stationary blade 32 may be omitted. This is because the air from the moving blade 31 can be guided to the second air path P2 by the airflow resistor 36.

Embodiment 3

Figure 18A:
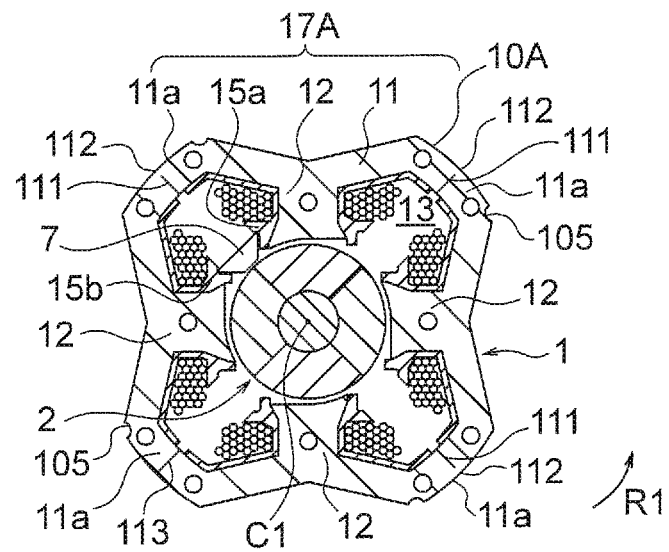
FIG. 18(A) is a cross sectional view illustrating a motor according to Embodiment 3.

Embodiment 3 of the present invention will be described next. FIG. 18(A) is a cross sectional view illustrating a motor according to Embodiment 3. The motor 100 (FIG. 6) according to the above-described Embodiment 1 includes the stator core 10 formed by a combination of the plurality of split cores 17. In contrast, the motor according to Embodiment 3 includes a stator core 10A formed by a combination of a plurality of joint cores 17A connected with each other via thin portions 112.

As illustrated in FIG. 18(A), separating surfaces 111 and thin portions 112 are formed on three back yokes 11a among four back yokes 11a of the stator core 10A, in place of the split surfaces 106 described in Embodiment 1 (FIG. 6). Each separating surface 111 extends from the inner circumference toward the outer circumference of the back yoke 11a, but does not reach the outer circumference of the back yoke 11a. Deformable thin portions (that is, connecting portions) 112 are formed between the terminal ends of the separating surfaces 111 and the outer circumferences of the back yokes 11a. Crimping portions may be provided in place of the thin portions 112.

Welding surfaces (that is, bonding surfaces) 113 are formed on one of the four back yokes 11a of the stator core 10A. The welding surfaces 113 extend from the inner circumference toward the outer circumference of the back yoke 11a, and reach the outer circumference of the back yoke 11a.

In the stator core 10A, each of blocks divided by the separating surfaces 111 and the thin portions 112 (or the welding surfaces 113) is referred to as a joint core 17A. In this example, the stator core 10A includes four joint cores 17A each including one tooth 12.

Figure 18B:
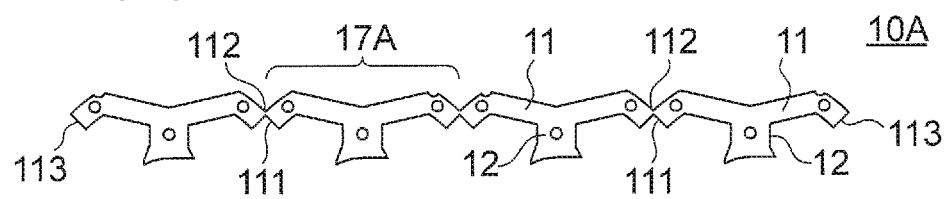
FIG. 18(B) is a diagram illustrating a state where the stator core is expanded.

FIG. 18(B) is a schematic view illustrating a state where the stator core 10A is expanded into a strip. The stator core 10A can be expanded into a strip as illustrated in FIG. 18(B) by deforming the thin portions 112 from the state illustrated in FIG. 18(A). The joint cores 17A are connected to each other via the thin portions 112 and aligned in a row. The welding surfaces 113 are located at both ends of the row.

In an assembly process of the motor, in a state where the joint cores 17A are expanded into a strip (FIG. 18(B)), the insulating portions 14 (including sensor fixing portions 15a and 15b) are fitted to the joint cores 17A. Thereafter, the coils 18 are wound around the insulating portions 14, and the joint cores 17A are curved in an annular shape, and then the welding surfaces 113 are welded together to obtain the stator core 10A. Then, the sensor 7 is mounted to the sensor fixing portions 15a and 15b between two teeth 12. Other structures of the stator core 10A are the same as those of the stator core 10 described in Embodiment 1.

In the motor according to this Embodiment 3, the stator core 10A is formed by the joint cores 17A, and thus an operation for fitting the insulating portions 14 and the sensor fixing portions 15a and 15b, and an operation for winding the coils 18 are easier as compared to when the stator core 10A is formed of an integrated core. Therefore, even when the size of the motor 100 is reduced, it is possible to wind the coils 18 at high density and to enhance the coil space factor.

Modification 1.

FIG. 19 is a cross sectional view illustrating a motor according to Modification 1 of Embodiment 3. The motor (FIG. 18(A)) according to the above-described Embodiment 3 includes the stator core 10A formed by a combination of the plurality of joint cores 17A each including one tooth 12. In contrast, the motor according to Modification 1 includes a stator core 10B formed by a combination of a plurality of split cores 17B each including two teeth 12.

As illustrated in FIG. 19, among four back yokes 11a of the stator core 10B, two back yokes 11a are provided with the split surfaces 106 described in Embodiment 1 (FIG. 6), and the remaining two back yokes 11a are provided with no split surfaces 106. The back yokes 11a provided with the split surfaces 106 and the back yokes 11a provided with no split surfaces 106 are alternately arranged in the circumferential direction.

In the stator core 10B, each of blocks divided by the split surfaces 106 is referred to as a split core 17B. In this example, the stator core 10B includes two split cores 17B each including two teeth 12.

In an assembly process of the motor, the insulating portions 14 (including the sensor fixing portions 15a and 15b) are fitted to the split cores 17B. Thereafter, the coils 18 are wound around the insulating portions 14, and then two split cores 17B are combined with each other to obtain the stator core 10B. The sensor 7 is then mounted to the sensor fixing portions 15a and 15b between two teeth 12. Other structures of the stator core 10B are the same as those of the stator core 10 described in Embodiment 1. In this Modification 1, the same effect as that of Embodiment 3 can be obtained.

Modification 2.

Figure 20:
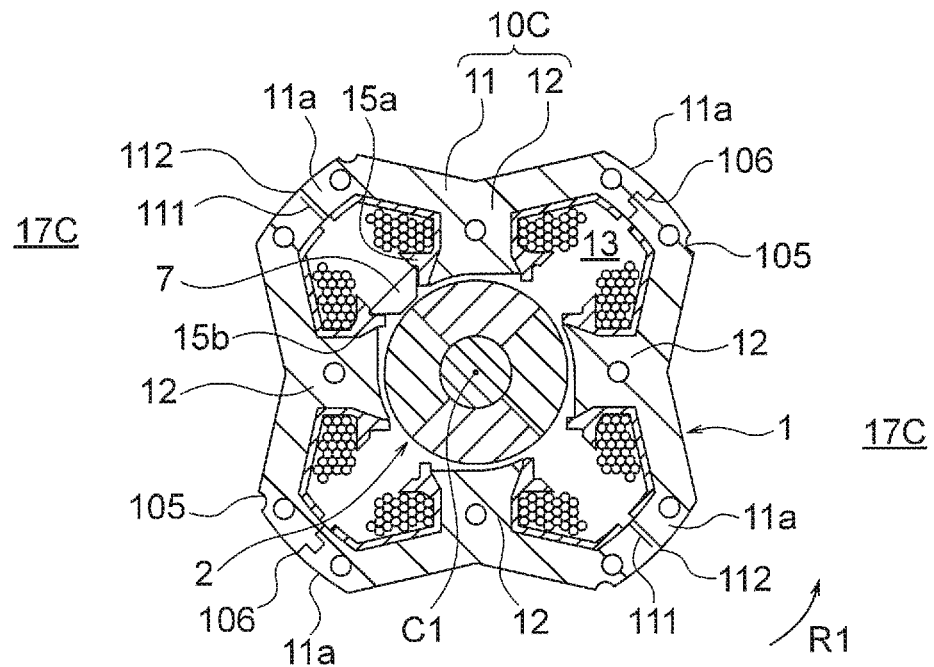
FIG. 20 is a cross sectional view illustrating a motor according to Modification 2 of Embodiment 3.

FIG. 20 is a cross sectional view illustrating a motor according to Modification 2 of Embodiment 3. The motor (FIG. 18(A)) according to the above-described Embodiment 3 includes the stator core 10A formed by a combination of the plurality of joint cores 17A. In contrast, the motor according to Modification 2 includes a stator core 10C formed by a combination of split cores and joint cores.

As illustrated in FIG. 20, among four back yokes 11a of the stator core 10C, two back yokes 11a are provided with the split surfaces 106 described in Embodiment 1 (FIG. 6), and the remaining two back yokes 11a are provided with the separating surfaces 111 and the thin portions 112 described in Embodiment 3 (FIG. 18). The back yokes 11a provided with the split surfaces 106 and the back yokes 11a provided with the separating surfaces 111 and the thin portions 112 are alternately arranged in the circumferential direction.

In the stator core 10C, each of blocks divided by the split surfaces 106 is referred to as a split core 17C. In this example, the stator core 10C includes two split cores 17C each including two teeth 12. Each split core 17C is expandable at its center in the circumferential direction by the thin portion 112.

In an assembly process of the motor, in a state where the split cores 17C are each expanded into a strip, the insulating portions 14 (including sensor fixing portions 15a and 15b) are fitted to the split cores 17C. Thereafter, the coils 18 are wound around the insulating portions 14, and then two split cores 17C are combined with each other to obtain the stator core 10C. Then, the sensor 7 is mounted to the sensor fixing portions 15a and 15b between two teeth 12. Other structures of the stator core 10C are the same as those of the stator core 10 described in Embodiment 1. In this Modification 2, the same effect as that of Embodiment 3 can be obtained.

Modification 3.

Figure 21:
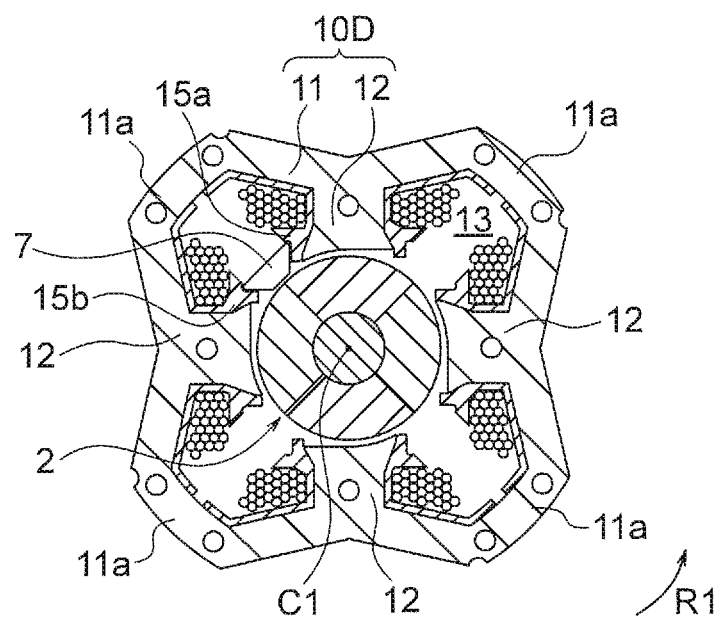
FIG. 21 is a cross sectional view illustrating a motor according to Modification 3 of Embodiment 3.

FIG. 21 is a cross sectional view illustrating a motor according to Modification 3 of Embodiment 3. The motor (FIG. 18(A)) according to the above-described Embodiment 3 includes the stator core 10A formed by a combination of the plurality of joint cores 17A. In contrast, the motor according to Modification 4 includes a stator core 10D having an integrated structure.

As illustrated in FIG. 21, the stator core 10D is provided with neither the split surfaces 106 described in Embodiment 1 (FIG. 6), nor the separating surfaces 111 and the thin portions 112 described in Embodiment 3 (FIG. 18). Thus, it is necessary to fit the insulating portions 14 and the sensor fixing portions 15a and 15b to the annular stator core 10D, and to wind the coils 18 on the annular stator core 10D. Other structures of the stator core 10D are the same as those of the stator core 10 described in Embodiment 1.

The stator cores 10 to 10D each including four teeth 12 have been described in the above-described Embodiments and Modifications, but it is sufficient that the number of teeth is two or more. Furthermore, the yoke 11 of each of the stator cores 10 to 10D includes the back yokes 11a and the connecting yokes 11b in the above description, but the yoke 11 may be formed as an annular yoke.

(Electric Vacuum Cleaner)

Figure 22:
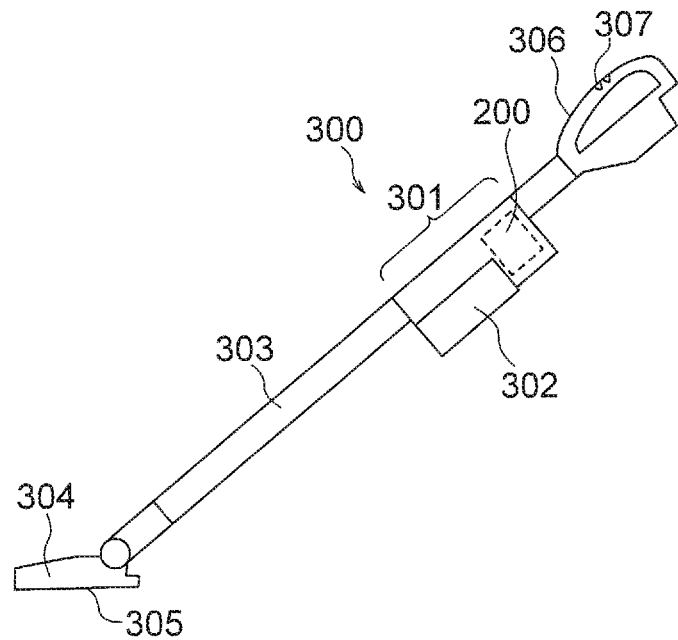
FIG. 22 is a diagram illustrating an electric vacuum cleaner to which the electric blower according to each Embodiment is applicable.

An electric vacuum cleaner to which the electric blower according to each of the Embodiments and the Modifications is applicable will be described below. FIG. 22 is a schematic view illustrating an electric vacuum cleaner 300 including the electric blower 200 (FIG. 1) according to Embodiment 1.

The electric vacuum cleaner 300 includes a cleaner main body 301, a pipe 303 connected to the cleaner main body 301, and a suction portion 304 connected to an end of the pipe 303. The suction portion 304 is provided with a suction port 305 for sucking air containing dust. A dust collecting container 302 is disposed in the cleaner main body 301.

An electric blower 200 for sucking air containing dust from the suction port 305 into the dust collecting container 302 is disposed into the cleaner main body 301. The electric blower 200 has, for example, the configuration illustrated in FIG. 1. The cleaner main body 301 is provided with a grip portion 306 to be gripped by a user, and the grip portion 306 is provided with an operation portion 307 such as an ON/OFF switch.

When the user grips the grip portion 306 and operates the operation portion 307, the electric blower 200 is activated and the motor 100 rotates. When the electric blower 200 is activated, suction air is produced. Thus, dust is sucked together with air through the suction port 305 and the pipe 303. The sucked dust is stored in the dust collecting container 302.

The electric vacuum cleaner 300 uses the highly reliable electric blower 200, and can therefore achieve high operating efficiency. The electric blower according to other Embodiments or Modifications may be used in place of the electric blower 200 according to Embodiment 1.

(Hand Dryer)

Figure 23:
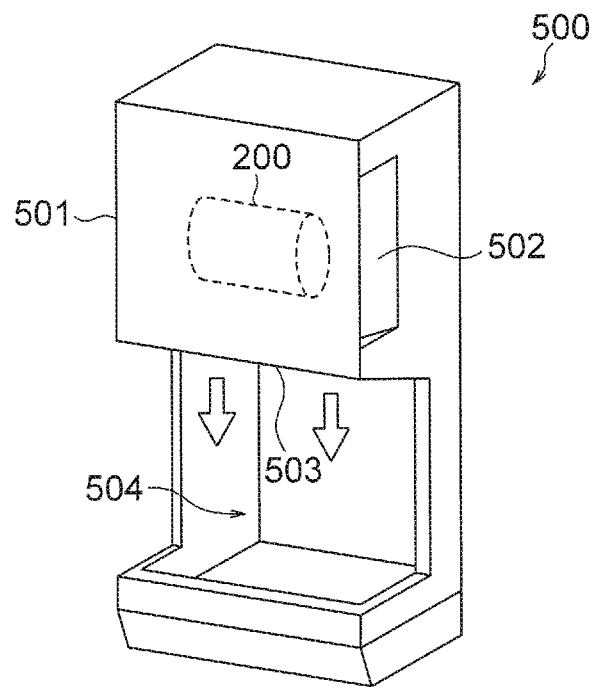
FIG. 23 is a perspective view illustrating a hand dryer to which the electric blower according to each Embodiment is applicable.

A hand dryer to which the electric blower according to each of the Embodiments and the Modifications is applicable will be described below. FIG. 23 is a schematic view illustrating a hand dryer 500 using the electric blower 200 (FIG. 1) according to Embodiment 1.

The hand dryer 500 includes a casing 501, and an electric blower 200 fixed in the casing 501. The electric blower 200 has, for example, the configuration illustrated in FIG. 1. The casing 501 includes an air inlet 502, an air outlet 503, and a hand insertion portion 504 which is provided below the air outlet 503 and into which hands of a user are to be inserted. The electric blower 200 generates an airflow to suck air outside the casing 501 through the air inlet 502, and blows the air to the hand insertion portion 504 through the air outlet 503.

When the hand dryer 500 is turned on, an electric power is supplied to the electric blower 200, and the motor 100 is driven. When the electric blower 200 is driven, air outside the hand dryer 500 is sucked through the air inlet 502 and blown out through the air outlet 503. When the hands of the user are inserted into the hand insertion portion 504, water droplets attached to the hands can be blown off or evaporated by the air blown from the air outlet 503.

The hand dryer 500 uses the highly reliable electric blower 200, and can therefore achieve high operating efficiency. The electric blower according to other Embodiments or Modifications may be used in place of the electric blower 200 according to Embodiment 1.

While desirable embodiments of the present invention have been described in detail above, the present invention is not limited thereto, and various improvements or modifications may be made without departing from the gist of the present invention.

What is claimed is:

1. An electric blower comprising:
a motor comprising a rotor having a rotation shaft, and a stator provided to surround the rotor;
a moving blade mounted at one end side of the rotation shaft in an axial direction of the rotation shaft;
a bearing portion provided between the moving blade and the stator in the axial direction and rotatably supporting the rotation shaft;
a frame; and
a board disposed on a side opposite to the moving blade with respect to the stator, the board facing the stator in the axial direction,
the frame comprising:
a motor housing portion housing the stator;
a bearing housing portion housing the bearing portion;
a wall formed between the motor housing portion and the bearing housing portion, and facing the moving blade; and
a hole passing through the wall,
wherein the electric blower further comprises a first air path outside the frame, and a second air path inside the frame,
wherein an air volume in the first air path is larger than an air volume in the second air path,
wherein the electric blower further comprises:
an air guide member for guiding an airflow generated by the moving blade to the second air path; and
a stationary blade provided between the moving blade and the frame, and
wherein the air guide member comprises an air guide plate provided on a surface of the stationary blade on the frame side.

2. The electric blower according to claim 1, wherein the bearing portion has at least two bearings.

3. The electric blower according to claim 1, wherein a minimum sectional area in the first air path is larger than a minimum sectional area in the second air path.

4. The electric blower according to claim 1, wherein each of the motor housing portion and the bearing housing portion has a cylindrical shape about a central axis of the rotation shaft.

5. The electric blower according to claim 1, wherein the air guide member comprises an airflow resistor provided in the first air path.

6. The electric blower according to claim 5, wherein the airflow resistor is a porous body.

7. The electric blower according to claim 5, wherein the airflow resistor is a soundproofing material.

8. The electric blower according to claim 1, wherein the stator comprises a stator core having at least one of a plurality of blocks combined with each other at a split surface, and a plurality of blocks connected with each other via a connecting portion.

9. The electric blower according to claim 8, wherein a portion including the split surface or the connecting portion in the stator is exposed in the second air path.

10. The electric blower according to claim 1, wherein a path through which air from the first air path flows in a radial direction about a central axis of the rotation shaft after blowing against the board is shorter than a path through which air from the second air path flows in the radial direction after blowing against the board.

11. The electric blower according to claim 1, wherein the board has a first circuit region on a side facing the stator, and a second circuit region on a side opposite to the stator, and
wherein a current flowing in the first circuit region is higher than a current flowing in the second circuit region.

12. An electric vacuum cleaner comprising:
a suction portion having a suction port;
a dust collecting container for storing dust; and
the electric blower according to claim 1, the electric blower sucking air containing dust from the suction portion into the dust collecting container.

13. A hand dryer comprising:
a casing having an air inlet and an air outlet; and
the electric blower according to claim 1 disposed in the casing, the electric blower sucking air through the air inlet and blowing the air through the air outlet.

14. An electric blower comprising:
a motor comprising a rotor having a rotation shaft, and a stator provided to surround the rotor;
a moving blade mounted at one end side of the rotation shaft in an axial direction of the rotation shaft;
a bearing portion provided between the moving blade and the stator in the axial direction and rotatably supporting the rotation shaft;
a frame; and
a board disposed on a side opposite to the moving blade with respect to the stator, the board facing the stator in the axial direction,
the frame comprising:
a motor housing portion housing the stator;
a bearing housing portion housing the bearing portion;
a wall formed between the motor housing portion and the bearing housing portion, and facing the moving blade; and
a hole passing through the wall,
wherein the electric blower further comprises a first air path outside the frame, and a second air path inside the frame,
wherein an air volume in the first air path is larger than an air volume in the second air path, and
wherein the electric blower further comprises:
an air guide member for guiding an airflow generated by the moving blade to the second air path;
a stationary blade provided between the moving blade and the frame; and
a member provided between the stationary blade and the frame and having an air guide plate as the air guide member.

* * * * *